United States Patent
Mäkelä et al.

(10) Patent No.: US 7,725,232 B2
(45) Date of Patent: May 25, 2010

(54) ARRANGEMENT FOR MONITORING THE LOCATION OF A MINING VEHICLE IN A MINE

(75) Inventors: Hannu Mäkelä, Helsinki (FI); Riku Pulli, Tampere (FI); Timo Soikkeli, Pirkkala (FI)

(73) Assignee: Sandvik Mining and Construction OY, Tampere (FI)

( * ) Notice: Subject to any disclaimer, the term of this patent is extended or adjusted under 35 U.S.C. 154(b) by 0 days.

(21) Appl. No.: 10/562,938

(22) PCT Filed: Jun. 28, 2004

(86) PCT No.: PCT/FI2004/000392

§ 371 (c)(1),
(2), (4) Date: Dec. 30, 2005

(87) PCT Pub. No.: WO2005/003875

PCT Pub. Date: Jan. 13, 2005

(65) Prior Publication Data
US 2006/0167608 A1 Jul. 27, 2006

(30) Foreign Application Priority Data

Jul. 3, 2003 (FI) .................................. 20031007
Jan. 16, 2004 (FI) .................................. 20040059

(51) Int. Cl.
*G05D 3/00* (2006.01)
*G06F 19/00* (2006.01)
*G06G 7/00* (2006.01)
*G06G 7/76* (2006.01)

(52) U.S. Cl. ............................ 701/50; 701/23; 701/28; 701/201; 701/207; 701/214; 701/216; 701/223; 701/224; 299/1.05; 299/1.4; 299/1.5; 299/1.6; 299/12; 299/19; 299/30; 180/317; 318/580

(58) Field of Classification Search ............ 701/50, 701/201, 207, 214, 216, 223, 224, 23, 28; 299/1.05, 30, 1.4, 1.5, 1.6, 19, 12; 180/317; 318/580

See application file for complete search history.

(56) References Cited

U.S. PATENT DOCUMENTS 4,586,571 A * 5/1986 Rajakallio et al. ........... 173/193
4,716,530 A * 12/1987 Ogawa et al. ................. 701/23
4,884,847 A * 12/1989 Bessinger et al. .......... 299/1.05

(Continued)

FOREIGN PATENT DOCUMENTS

EP 1243939 A1 9/2002

(Continued)

OTHER PUBLICATIONS

Lehtinen, H., Kaarmila, P., Blom, M., Kauppi, I., Kerva, J. (2000), "Mobile robots evolving in industrial applications", Proceedings of the 31st International Symposium on Robotics, Montreal, pp. 96-101.*

*Primary Examiner*—Khoi Tran
*Assistant Examiner*—Jorge O Peche
(74) *Attorney, Agent, or Firm*—Drinker Biddle & Reath LLP

(57) ABSTRACT

A method and a system for monitoring the location of a mining vehicle in a mine. The mine comprises a first and a second work area. At least one identifier (29) whose exact location is known is arranged in the first work area (18*a*). The location of the mining vehicle (1) is determined continuously by means of a dead reckoning. The location data, based on the dead reckoning, can be updated by means of the identifier. The location data are transmitted to a mine control system for monitoring the mining vehicle.

10 Claims, 3 Drawing Sheets

U.S. PATENT DOCUMENTS

| | | | | |
|---|---|---|---|---|
| 5,041,722 A * | 8/1991 | Suzuki et al. | ............... | 250/202 |
| 5,393,937 A * | 2/1995 | Etherington et al. | ........ | 177/141 |
| 5,530,330 A * | 6/1996 | Baiden et al. | .............. | 318/580 |
| 5,911,767 A * | 6/1999 | Garibotto et al. | ............. | 701/28 |
| 5,956,250 A | 9/1999 | Gudat et al. | | |
| 5,999,865 A * | 12/1999 | Bloomquist et al. | ........... | 701/25 |
| 6,163,745 A * | 12/2000 | Purchase et al. | .............. | 701/23 |
| 6,168,240 B1 * | 1/2001 | Stickel et al. | ................. | 299/12 |
| 6,349,249 B1 * | 2/2002 | Cunningham | ................. | 701/28 |
| 6,442,476 B1 * | 8/2002 | Poropat | ....................... | 701/207 |
| 6,470,989 B1 * | 10/2002 | Puputti et al. | ...................... | 180/275 |
| 6,616,244 B2 * | 9/2003 | Hakkinen | ................. | 299/1.05 |
| 6,697,147 B2 * | 2/2004 | Ko et al. | .................... | 356/4.03 |
| 6,732,826 B2 * | 5/2004 | Song et al. | ................. | 180/169 |
| 6,751,535 B2 * | 6/2004 | Mori | ........................ | 701/23 |
| 6,898,503 B2 * | 5/2005 | Makela | ........................ | 701/50 |
| 7,139,651 B2 * | 11/2006 | Knowlton et al. | ............. | 701/50 |
| 7,302,359 B2 * | 11/2007 | McKitterick | ................. | 702/155 |
| 7,392,151 B2 * | 6/2008 | Makela | ........................ | 702/150 |
| 7,516,039 B2 * | 4/2009 | McKitterick | ................. | 702/155 |
| 7,603,235 B2 * | 10/2009 | Makela et al. | ................ | 701/301 |
| 7,643,934 B2 * | 1/2010 | Makela | ........................ | 701/201 |
| 2003/0052529 A1 * | 3/2003 | Hakkinen | ................... | 299/1.05 |
| 2005/0197755 A1 * | 9/2005 | Knowlton et al. | ............. | 701/50 |
| 2006/0046642 A1 * | 3/2006 | Bassiri et al. | ................... | 455/7 |
| 2006/0190165 A1 * | 8/2006 | Makela et al. | ................ | 701/207 |

FOREIGN PATENT DOCUMENTS

| | | | |
|---|---|---|---|
| FI | 20000628 110806 B | | 9/2001 |
| WO | 01/07976 A1 | | 2/2001 |
| WO | 01/69041 A1 | | 9/2001 |
| WO | WO 0169041 A1 | * | 9/2001 |
| WO | 02/054813 A1 | | 7/2002 |
| WO | 03/012470 A2 | | 2/2003 |

* cited by examiner

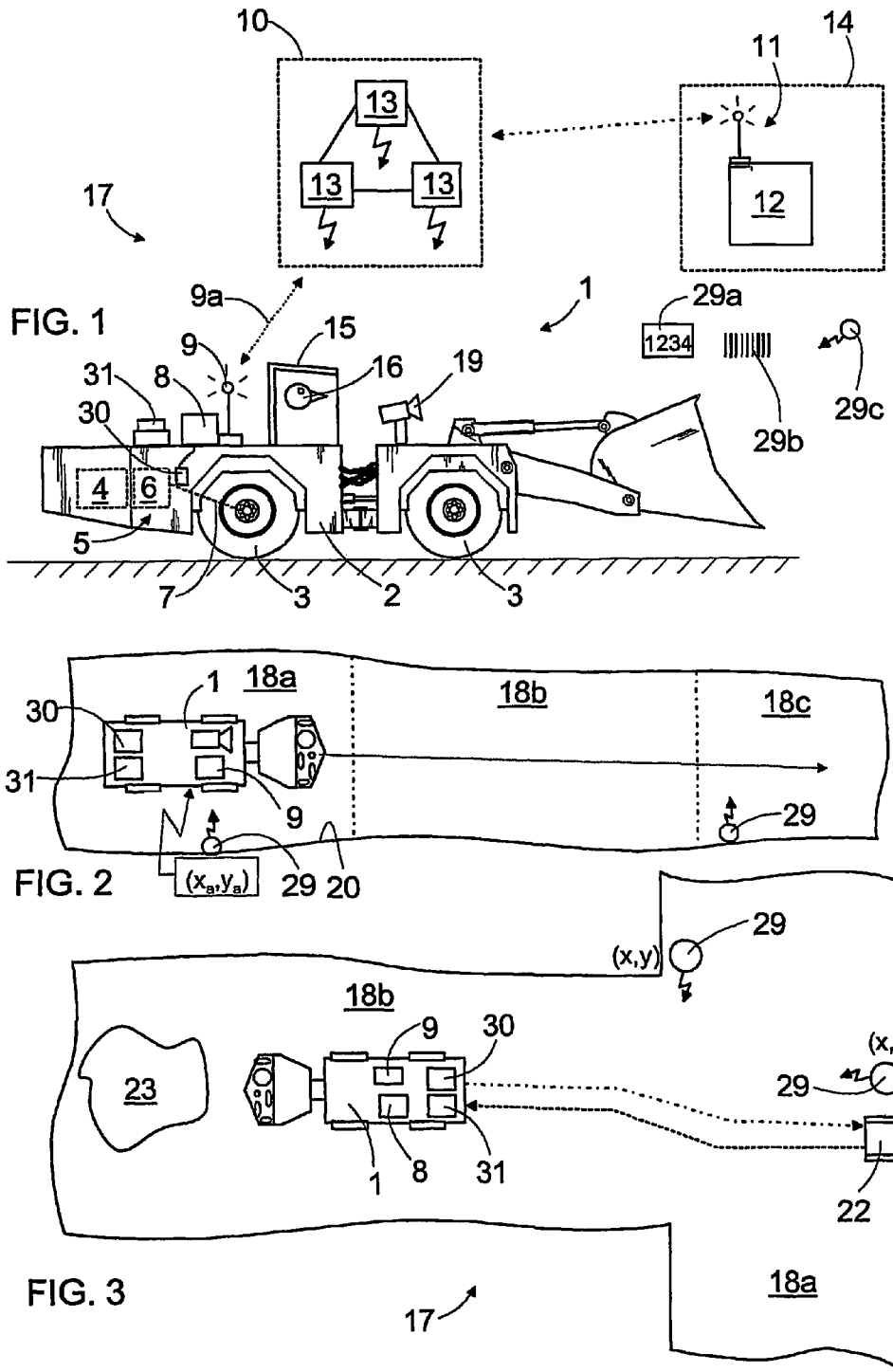

ARRANGEMENT FOR MONITORING THE LOCATION OF A MINING VEHICLE IN A MINE

BACKGROUND OF THE INVENTION

The invention relates to a method of monitoring the location of a mining vehicle in a mine, the method comprising: driving at least one mining vehicle during one work cycle at least in a first work area and in a second work area of the mine; determining data on the location of the mining vehicle in the mine; transferring said location data to a mine control system; employing, in location data transfer, a data communication connection communicating with the mine control system; and employing the obtained location data in the mine control system for monitoring the operation of the mining vehicle.

The invention further relates to a system for monitoring the location of a mining vehicle in a mine, the system comprising: a first work area and a second work area in the mine, in which areas the mining vehicle is arranged to drive during one work cycle; at least one measuring device for determining the distance travelled by the mining vehicle, and further at least one measuring device for determining the direction of the mining vehicle; a mine control system; at least one control unit arranged in the mining vehicle; at least one data transfer connection for data transfer between the control unit of the mining vehicle and the mine control system; and in which system: location data of the mining vehicle are arranged to be transferred via the data transfer connection from the mining vehicle to the mine control system.

Different mining vehicles are used in a mine, such as rock drilling rigs, loading vehicles and transport vehicles. The mining vehicles may be manned or unmanned, and they can be equipped with measuring devices suitable for determining the location. In severe mining conditions, measuring error may easily occur, which makes the location determination inexact. This being so, the location of the mining vehicles operating in the mine cannot be monitored sufficiently accurately.

BRIEF DESCRIPTION OF THE INVENTION

The object of the present invention is to provide a new and improved method and system allowing the location of a mining vehicle in a mine or the like to be monitored.

The method of the invention is characterized by determining the location of the mining vehicle substantially continuously on the basis of a dead reckoning, wherein the distance travelled is calculated and the travel direction is determined; identifying, when operating in the first work area, at least one identifier whose location is accurately known; determining the location data of the mining vehicle on the basis of the identification data; and updating the location data determined in the dead reckoning on the basis of the location data of the identifier when driving in the first work area.

The system of the invention is characterized in that the location of the mining vehicle is arranged to be determined substantially continuously on the basis of a dead reckoning by taking into account the distance travelled and the direction; that at least one identifier whose location is known to the control unit is arranged in the first work area; that the mining vehicle is arranged to identify the identifier when driving in the vicinity of the identifier; that the control unit is arranged to determine location data on the basis of the identification data; and that the control unit is arranged to update the location determined in the dead reckoning on the basis of the location data of the identifier.

The essential idea of the invention is that the mining vehicle comprises means for what is called a dead reckoning. In this case, the mining vehicle is equipped with measuring devices for determining the distance travelled and the direction of the vehicle. During the work cycle, the mining vehicle drives in at least two work areas, i.e. a first and a second work area. The dead reckoning is employed for determining the location in both work areas. Furthermore, at least one identifier whose location is accurately known is arranged in the first work area. When operating in the first work area, the mining vehicle is able to identity the identifier and determines its location based thereon. These location data can be employed for correcting any errors in the dead reckoning. In other words, this allows the location obtained by the dead reckoning to be updated. The control unit of the mining vehicle can use a wireless network or another data transfer connection to transmit the location data to the mine control system, which is thus informed of the exact location of the mining vehicle and is thus able to accurately monitor the operation of the mining vehicle in the mine. Monitoring the location of the mining vehicles operating in a mine allows the tasks performed in the mine to be controlled more efficiently than previously and furthermore it allows the realization of the plans concerning the mine to be monitored.

The essential idea of an embodiment of the invention is that one or more identifiers are arranged in predetermined critical locations in the first work area. Such locations may include for instance unloading stations, connecting tunnels, and other main passages in the mine.

The essential idea of an embodiment of the invention is that the identifier is a transmitter. In this case, one or more transmitters arranged to transmit a signal may be arranged in the first work area. When the mining vehicle is in the coverage area of such a transmitter, it is able to receive a signal and use the signal as assistance in positioning.

The essential idea of an embodiment of the invention is to use a transmitter that transmits a radio-frequency signal as the identifier. The mining vehicle comprises a data transfer unit that is able to receive the signal when the mining vehicle is within the coverage area of the transmitter. The transmitters may be independent units, whereby they do not need to be connected to the mine control system or other networks. Accordingly, arranging individual transmitters in the mine is relatively simple.

The essential idea of an embodiment of the invention is to generate an electronic map of the route driven by the mining vehicle. Route points whose coordinates are stored in the electronic map are determined for the route at predetermined intervals. Furthermore, identifiers, in this case, transmitters, are arranged in the first work area. When the mining vehicle is within the coverage area of such a transmitter, the coordinates of the route point closest to said transmitter are determined as the location of the mining vehicle. This may be performed by the transmitter being arranged to transmit the location data of said route point, which the mining vehicle receives. Alternatively, the transmitter transmits identifier data, based on which the mine control system or the control unit in the mining vehicle combines the received identifier data and the location data of the nearest route point of the transmitter.

The essential idea of an embodiment of the invention is to employ a visually readable identifier as the identifier. The visual identifier may comprise for instance a remote-readable code, such as a bar code or the like. The code may comprise location data, for example. Such a visual identifier can be read for instance with a laser scanner or a camera.

The essential idea of an embodiment of the invention is to employ an identifier comprising a receiver. In this case, when driving in the first work area, a signal can be transmitted from a transmitter comprised by the mining vehicle for reading the identifier. The transmitter of the mining vehicle may be arranged to identify the moment when the receiver of the identifier receives the signal transmitted by the mining vehicle. This way information is obtained stating that the identifier is located within the coverage area of the transmitter comprised by the mining vehicle, allowing the location of the mining vehicle to be determined to be the coordinates known in advance of the identifier read. The identifier may be a so-called RF tag.

The essential idea of an embodiment of the invention is that at least the first work area is provided with a wireless network comprising a plurality of base stations. The base stations may also be some kind of identifiers arranged in the mine. The location of the mining vehicle may be determined by means of positioning carried out in the wireless network when the mining vehicle is within the coverage area of one or more base stations.

The essential idea of an embodiment of the invention is that the mining vehicle is a loading vehicle comprising a bucket for transporting and loading mined material. The first work area of the mine is an unloading site for broken rock and the second work area is a loading site that may be located in the production tunnel of the mine. When the loading vehicle is driven at the loading site, only the dead reckoning is employed for location determination. When driving takes place at the unloading site, both the dead reckoning and the location data determined based on the identifier are utilized in location determination.

BRIEF DESCRIPTION OF THE FIGURES

The invention will be described in more detail in the attached drawings, wherein FIG. 1 is a schematic side view of a mining vehicle, FIG. 2 is a schematic top view of a mining vehicle and work areas in a mine, FIG. 3 is a schematic top view of a mining vehicle and one of its work cycles.

In the figures, the invention is shown in a simplified manner for the sake of clarity. In the figures, like parts are designated by like reference numerals.

DETAILED DESCRIPTION OF THE INVENTION

Figure 4:
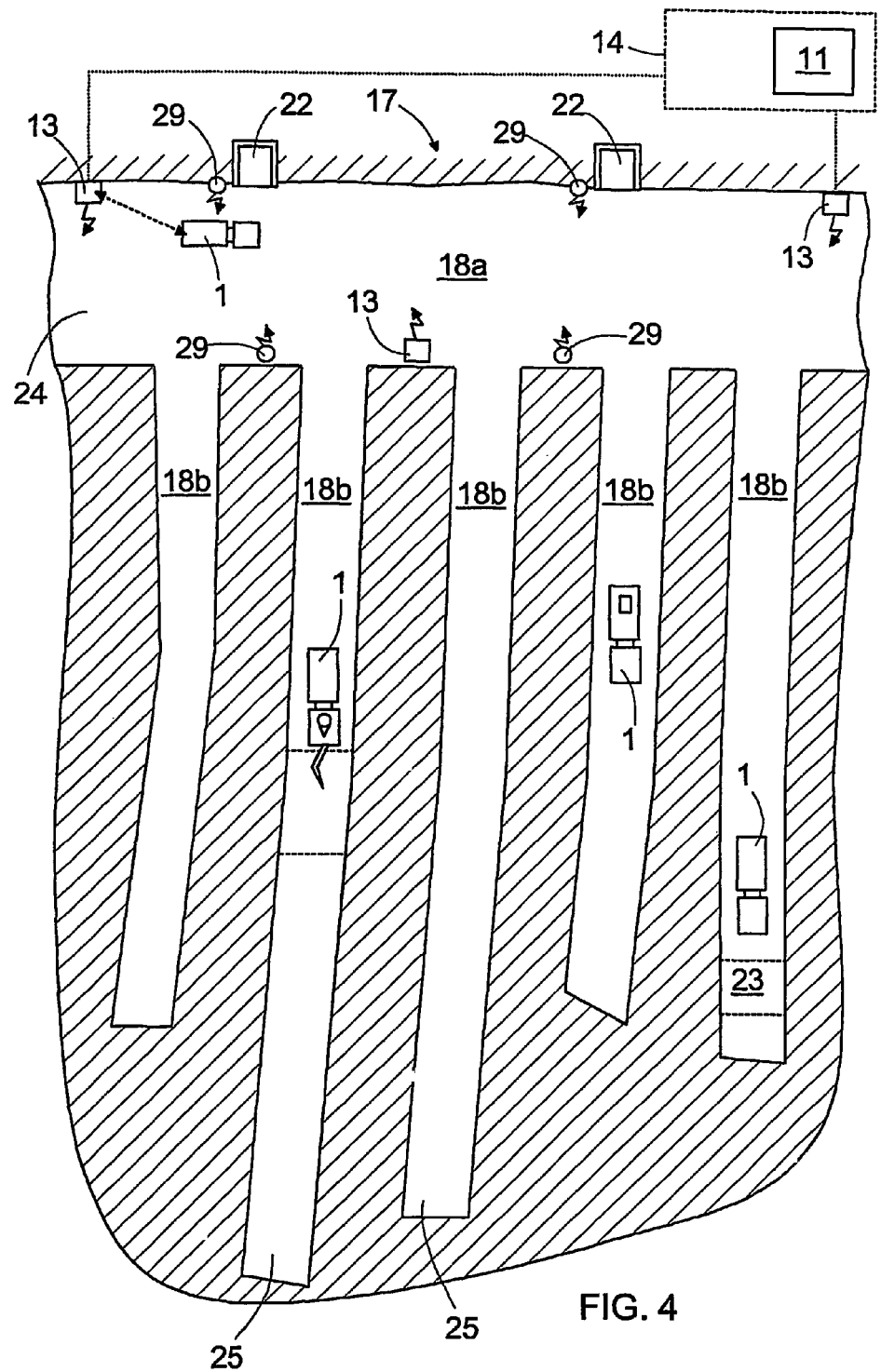
FIG. 4 is a schematic top view of a part of a mine provided with the monitoring system according to the invention.

FIG. 1 shows a mining vehicle 1, in this case a loading vehicle whose front end comprises a bucket for transporting and loading mined material. Alternatively, the mining vehicle 1 may be a rock drilling device or a transport vehicle provided with a platform, for example. The mining vehicle 1 comprises a movable chassis 2 having a plurality of wheels 3, of which at least one is a traction wheel, which an engine 4 employs by means of power transmission 5. The power transmission 5 usually comprises a gearbox 6 and necessary cardan shafts 7, differentials and other transmission means for transferring the rotation torque from the engine 4 to the traction wheels. In addition, the mining vehicle 1 is provided with a control system comprising at least a first control unit 8 arranged to control the actuators in the mining vehicle 1 for steering and using the vehicle. Furthermore, the mining vehicle 1 may comprise a data transfer unit 9 or a terminal by means of which the first control unit 8 is able to establish a data transfer connection 9a to a wireless network 10 in the mine, and furthermore, use the wireless network 10 for communicating with a second control unit 12 comprised by a control system 11 of the mine. When several mining vehicles are operating simultaneously in a mine 17, the network 10 may be arranged to identify an identifier or code transmitted by the mining vehicle 1, enabling the identification of each mining vehicle 1 operating in the mine 17 at all times. The wireless network 10 comprises a plurality of base stations 13 that may communicate with each other and to the outside of the network. The connection between the wireless network 10 and the mine control system 11 may be wireless or wired. The mine control system 11 and the second control unit 12 comprised by it may be located in a control room 14, which may be arranged outside the mine. The control units 8 and 12 may be computers or corresponding devices.

In some cases, the data transfer connection 9a between the mining vehicle 1 and the mine control system 11 may also be wired.

The mining vehicle 1 may be manned, whereby it comprises a control cabin 15 for an operator 16. The operator 16 is responsible for steering the manned mining vehicle 1, whereby exact positioning is not necessarily required for steering such a mining vehicle 1. On the other hand, the mining vehicle 1 may be unmanned. An unmanned mining vehicle may be controlled by remote control from a separate control room for instance based on a video image, or an independently controlled mining vehicle provided with a navigation system may be concerned.

The mining vehicle 1 may comprise means for determining its location. The location of the mining vehicle 1 may be determined by what is known as the dead reckoning technique, provided the distance travelled and the direction of the vehicle are known. The direction of the mining vehicle 1 can be found out for instance by means of a gyroscope 31 or the like. The distance travelled, in turn, may be calculated in the control unit 8 of the vehicle after suitable sensors 30 have first measured rotational data directly from a wheel 3 of the vehicle 1, or, alternatively, from the power transmission 5 or the engine 4. The rotational motion of the wheel 3 can be calculated in the control system, provided the transmission ratios are known. Furthermore, the control unit 8 is able to calculate the magnitude of the distance travelled by the vehicle 1 based on the rotational motion and diameter of the wheel 3. There are also other ways to measure the distance travelled. For example, the speed of the mining vehicle 1 can be measured by using suitable sensors to measure the motion of the vehicle relative to the ground. In addition to the above devices, the mining vehicle 1 may also comprise other devices employed for determining the location. Examples include various laser scanners 19, ultrasound devices and the like.

Location data may be transmitted by using the wireless network 10 to the second control unit 12 comprised by the mine control system 11. The mine control system 11 can use the location data to monitor the movements of the mining vehicle 1 in the mine. The mine control system 11 may comprise a user interface enabling manual monitoring of the operating of the mining vehicles 1 in the mine 17. Furthermore, the mine control system 11 keeps a record of the movements of the mining vehicles 1 in the mine, and, in addition, the mine control system 11 may issue different reports and messages regarding the results of the monitoring. The control system 11 may also be arranged to give new working instructions based on the monitoring to the operator of the mining vehicle.

FIG. 1 shows that one or more identifiers 29a to 29c may be arranged in the mine 17, and they can be used for exact determination of the location of the mining vehicle and for correction of any error in the dead reckoning. The identifier may be a visual mark, such as identifiers 29a and 29b in the figure, or it may be an electronic device, such as identifier 29c.

FIG. 2 shows that work areas may be arranged in the mine 17, in this case a first work area 18a, a second work area 18b, and a third work area 18c. The mining vehicle 1 may be arranged to drive during one work cycle from the first work area 18a to the second work area 18b and further through the second work area 18b to the third work area 18c. The second work area 18b may be a production tunnel through which the mining vehicle 1 is arranged to drive. The first work area 18a and the third work area 18c may be areas wherein the conditions are better than in the production tunnel, allowing identifiers 29 to be arranged therein. One or more identifiers 29 may be arranged in the first work area 18a and the third work area 18c in exact, predetermined places. The exact locations of the identifiers 29 can be stored in the mine control system 11 and in the control unit 8 of the mining vehicle 1. In the first work area 18a and in the third work area 18c, the location of the mining vehicle 1 can be determined exactly based on the identifiers 29. On the other hand, the second work area 18b comprises no identifiers at all, but in that part, the location is determined based only on the dead reckoning technique.

The identifier 29 shown in FIG. 2 may be a transmitter whose operation may be based on the use of radio frequencies. The identifier 29 can be fastened to a wall surface 20 in a mine gallery, for example. The transmitter may transmit a radio signal, which the data transfer unit 9 of the mining vehicle 1 may receive. The radio signal may comprise identification data, based on which the control unit 8 in the mining vehicle 1, having received the signal, identifies the identifier 29 involved in each particular case. The location data of the identifiers 29 have been stored in or transmitted before the operation to the control unit 8 of the mining vehicle 1 by means of the wireless network 10. When the mining vehicle 1 enters the coverage area of the transmitter, the data transfer unit 9 may receive the signal and the control unit 8 is able to determine the location of the mining vehicle 1 based on the location of the identifier 29. The control system 8 may compare the location determined by means of the dead reckoning and the location determined with the identifier 29, and, based on this comparison, update the location data generated by the dead reckoning. The mine control system 11 may be informed about the updated location data via the wireless network 10, allowing the exact location in the mine of the mining vehicles 1 operating in the mine to be monitored. This allows any errors resulting from tyre slippage and inaccuracy of measuring devices, for example, to be corrected in the dead reckoning.

The transmitter shown in FIG. 2 may be any device based on wireless data transfer, capable of transmitting a receivable and identifiable signal. Accordingly, in addition to transmitters operating at the radio frequency, other relatively short-range transmitters can also be used. The transmitter may be an independent device that is not coupled to any network or other transmitters. This makes the arranging of a transmitter in the mine 17 simple and fast. The structure of the transmitter should be suitable for severe mining conditions. In addition, the transmitter may comprise fastening means by means of which it can be fastened to the wall 20, ceiling or floor of a mine gallery, for example.

FIG. 3 shows a second mine 17 having a first work area 18a and a second work area 18b. In the first work area 18a, one or more unloading sites 22 may exist. Furthermore, one or more identifiers 29 are arranged in the first work area 18a, allowing the location determination of the mining vehicle 1, based on the dead reckoning, to be updated. The second work area 18b, in turn, is a production tunnel, wherein the determination of the location of the mining vehicle is based only on the dead reckoning technique. When the mining vehicle 1 drives in the first work area 18a, its location is relatively accurately known. Furthermore, when the mining vehicle 1 continues its drive in the second work area 18b towards a loading site 23, usually a sufficiently accurate location is found out by the dead reckoning. However, in connection with loading, when the mining vehicle 1 is driven towards a pile of broken rock, the wheels 3 may slip, creating error in the dead reckoning. Similarly, for instance slippery spots in the production tunnel and marked roughness of the ground may cause measurement errors. Accordingly, in a situation when the mining vehicle 1 returns from the second work area 18b towards the first work area 18a, location determination based on the dead reckoning is no longer accurate. When the mining vehicle 1 enters the first work area 18a, its location can be determined by means of the identifier 29. The identifier 29 may be a so-called RF (Radio Frequency) tag comprising a receiver. When the RF tag is in the coverage area of the data transfer unit 9 of the mining vehicle 1 or a transmitter provided therein, and it receives a signal from the transmitter, the RF tag is activated. This can be observed in the mining vehicle 1 and may be used as the basis for concluding that the mining vehicle 1 is located at said identifier 29.

Furthermore, in the first work area 18a, the identifiers 29 may be placed at locations that are critical from the point of view of monitoring. Such locations may include unloading sites 22, for example. In addition, the identifiers may be arranged at locations requiring special monitoring of the traffic in the mine. Such locations may include for instance crossings of mine galleries, narrow and badly traversable stretches, and stretches having much traffic, etc.

FIG. 4 shows part of an underground mine 17. Alternatively, the mine 17 may be an opencast mine or the like. The mine 17 may comprise one or more connecting tunnels 24 and one or more production tunnels 25. The connecting tunnels 24 constitute the first work area 18a of the mine, and the production tunnels 25 constitute the second work area 18b of the mine. Actual rock breaking, for instance by blasting or mining, takes place in the production tunnel 25. The rock material, broken from the rock, can be transported with the transporting vehicle 1 from the loading site 23 in the production tunnel 25 to the connecting tunnel 24 and further to the unloading site 22, such as a transport shaft or a suitable conveyor. Several production tunnels 25 may communicate with the connecting tunnel 24, and, on the other hand, the connecting tunnel 24 may be provided with several unloading sites 22, as FIG. 4 shows. The production tunnels 25 may be very long, up to several hundreds of meters long. In addition, the conditions in the production tunnels 25 are severe because of drilling and blasting, for example, i.e. infrastructure exterior to the mining vehicle 1 is difficult to build in the production tunnels 25 for use as help in positioning. However, at the front end of each production tunnel 25, a base station may be placed by means of which a transport vehicle, a rock drilling rig or any other mining vehicle 1 operating in the production tunnel is able to establish a communication connection to the mine control system 11. The operation of the mining vehicles 1 in the mine 17 is monitored by the mine control system 11. When the mining vehicle 1 operates in the production tunnel 25, the location can be determined by means of devices in the mining vehicle 1. The location may be determined by using a so-called dead reckoning, i.e. by measuring the distance travelled and by determining the direction of travel. In the portion of the connecting tunnel 24, the dead reckoning can be corrected by identifying one or more identifiers 29 in the connecting tunnel 24, the location of the identifier 29 being accurately known.

Figure 5:
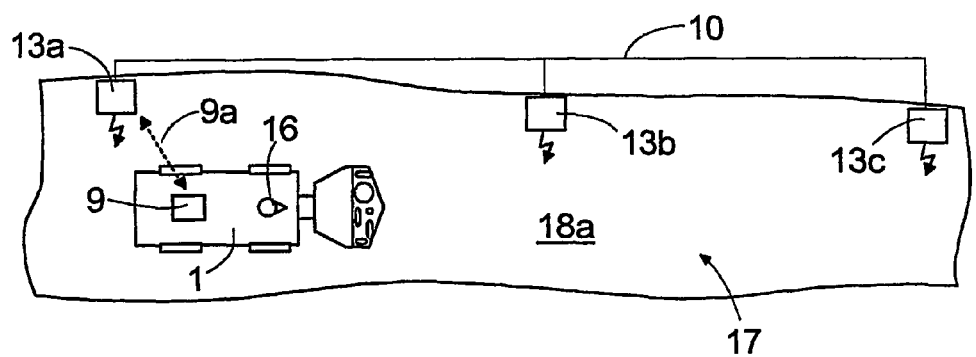
FIG. 5 is a schematic top view of a solution for determining the location of a mining vehicle in a wireless network.

FIG. 5 shows a manner of determining the location of a mining vehicle 1 in a wireless network 10 created in the first work area 18*a*. The wireless network 10 may comprise a plurality of base stations 13*a* to 13*c*. The base stations 13*a* to 13*c* are also certain kind of identifiers 29, whose location in the mine 17 is accurately known. As the mining vehicle 1 moves within the coverage area of the wireless network 10, the data transfer unit 9 in the mining vehicle 1 is able to establish a connection to one base station 13*a* to 13*c* at a time on the basis of predetermined criteria. The connection can be established to the base station closest to the mining vehicle 1 at each particular time, in this case to base station 13*a*, which has the strongest signal. In this case, the signal strength between the base station 13*a* and the data transfer unit 9 of the mining vehicle 1 is good. When the mining vehicle 1 moves in the mine 17 forward to the coverage area of the following base station 13*b*, the data transfer connection 9*a* can be changed to base station 13*b*. Such choice of base stations 13*a* to 13*c* in the network 10 is quite normal communication technique per se. However, the connection to the base station 13*a* to 13*c* can also be used for determining the location of the mining vehicle 1. In the simplest case, the location of the base station 13*a* to 13*c* with which the mining vehicle 1 communicates at each particular time can be selected as the approximate location of the mining vehicle 1. The locations of all base stations 13 are known to the mine control system, allowing the movements of the mining vehicle 1 in the mine 17 to be monitored with sufficient accuracy. The advantage of location determination based on the choice of base stations 13 is that it is simple to implement and yet sufficiently accurate for monitoring operations. If need be, a simple manner of improving the accuracy of location determination carried out in the wireless network 10 is to increase the number of base stations 13, i.e. improve the density of the network. Furthermore, in the mine 17, the base stations 13 may be located at locations that are critical as far as monitoring is concerned. Such locations may be unloading and loading sites, for example.

Figure 6:
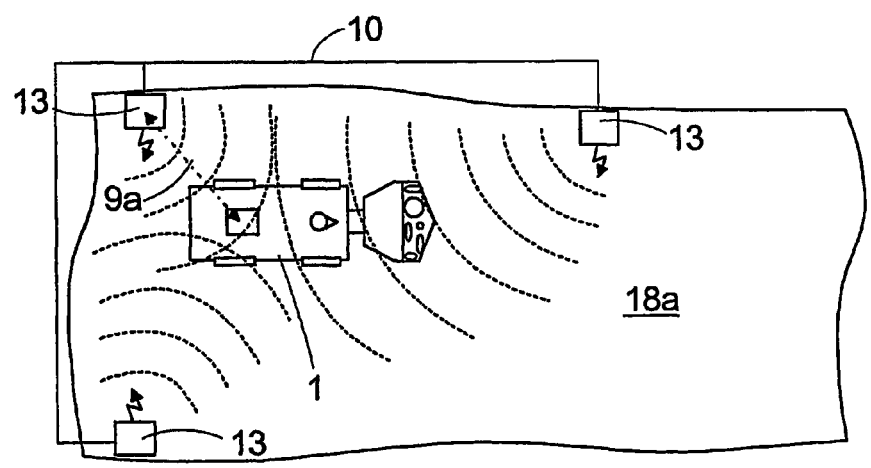
FIG. 6 is a schematic top view of a second solution for determining the location of a mining vehicle in a wireless network.

FIG. 6 shows a second solution for location determination in a wireless network 10. The base stations 13 in the wireless network 10 are certain kind of identifiers 29 whose position in the mine is accurately known. The location of the mining vehicle 1 can be carried out by calculating the location of the mining vehicle 1 within the coverage area of two or more base stations based on the strength of the signals transmitted by the base stations 13. This enables the determination of relatively accurate coordinates for the mining vehicle 1. The technique disclosed for instance in WO publication 02/054813 can be applied in the solution for determining the location in a wireless network.

Let it be mentioned that the systems according to FIGS. 5 and 6 can utilize any wireless network 10 based on base stations and suitable both for data transfer and location determination. In other words, a radio network, such as a mobile telephone network, can be involved. As examples of mobile telephone networks, the GSM (Global System for Mobile Communication), GPRS (General Packet Radio Service) and UMTS (Universal Mobile Telecommunications System) networks can be mentioned. Furthermore, the wireless network may be for instance a WLAN network (Wireless Local Area Network). If need be, other wireless local area network techniques described in standard IEEE 802.11 can also be applied. Other examples of wireless local area networks include a HiperLAN network (High Performance Radio Local Area Network) and a BRAN network (Broadband Radio Access Network).

In some cases, the location can be determined in the first work area by using several different identifiers. Accordingly, combinations of the above-described applications are feasible.

The drawings and the related description are only intended to illustrate the inventive idea. The details of the invention may vary within the scope of the claims.

The invention claimed is:

1. A method of monitoring the location of a mining vehicle in a mine, the method comprising:

driving at least one mining vehicle during one work cycle at least in a first work area, in a second work area, and in a third work area of the mine, wherein the first work area and the third work area are provided with at least one identifier whose location is accurately known, and the second work area is provided with no identifier;

determining data on the location of the mining vehicle in the mine;

transferring said location data to a mine control system;

employing, in location data transfer, a data communication connection communicating with the mine control system;

employing the obtained location data in the mine control system for monitoring the operation of the mining vehicle;

determining the location of the mining vehicle substantially continuously in the first work area, the second work area, and the third work area on the basis of a dead reckoning, wherein the distance traveled is calculated and the travel direction is determined;

determining, when operating in the second work area, the location of the mining vehicle only on the basis of the dead reckoning;

identifying, when operating in the first work area or the third work area, at least one identifier whose location is accurately known;

determining the location data of the mining vehicle on the basis of the identification data;

and updating the location data determined in the dead reckoning on the basis of the location data of the identifier only when driving in the first work area or the third work area, wherein the size of the second work area is sufficient to cause a mining vehicle passing from the first work area through the second work area to the third work area to have discontinuities in location updates obtained by identifiers with accurately known locations.

2. A method as claimed in claim 1, comprising:

arranging at least one readable identifier in a predetermined location in the first work area or the third work area, assigning the location data of the identifier in advance to a control unit in the mining vehicle, reading the identifier with at least one reading device in the mining vehicle, and determining the location of the mining vehicle in the first work area or the third work area on the basis of the location data of the identifier, and updating the location data obtained on the basis of the dead reckoning.

3. A method as claimed in claim 1, comprising:
arranging at least one readable identifier in a predetermined location in the first work area or the third work area,
assigning the location data of the identifier of the identifier in advance to a control unit in the mining vehicle,
reading the identifier with at least one reading device in the mining vehicle,
determining the location of the mining vehicle in the first work area or the third work area on the basis of the location data of the identifier, and updating the location data obtained on the basis of the dead reckoning,
and, reading a visual identifier arranged in the first work area or the third work area for determining the location of the mining vehicle.

4. A method as claimed in claim 1, comprising:
arranging at least one readable identifier in a predetermined location in the first work area or the third work area,
assigning the location data of the identifier in advance to a control unit in the mining vehicle,
reading the identifier with at least one reading device in the mining vehicle,
determining the location of the mining vehicle in the first work area or the third work area on the basis of the location data of the identifier, and updating the location data obtained on the basis of the dead reckoning,
arranging at least one identifier comprising a receiver in the first work area or the third work area,
transmitting a signal for reading the identifier from a transmitter in the mining vehicle when driving in the first work area or the third work area,
and determining the location of the identifier read as the location of the mining vehicle.

5. A method as claimed in claim 1, comprising:
arranging at least one transmitter that transmits a signal in a predetermined location in the first work area or the third work area,
receiving the signal by means of the data transfer unit in the mining vehicle when in the coverage area of the transmitter,
and determining the location of the mining vehicle on the basis of the signal and updating the location data obtained on the basis of the dead reckoning.

6. A method as claimed in claim 1, comprising:
creating a wireless network comprising a plurality of base stations placed in predetermined locations in the first work area or the third work area,
and determining the location of the mining vehicle in the first work area or the third work area by positioning carried out in the wireless network and updating the location data obtained on the basis of the dead reckoning.

7. A method as claimed in claim 1, comprising:
driving the mining vehicle, suitable for transporting, in accordance with a work cycle,
driving the mining vehicle from a first unloading area to a loading area,
loading cargo into the mining vehicle in the loading area,
driving the loaded mining vehicle from the loading area to a second unloading area,
unloading the cargo of the mining vehicle in the second unloading area,
determining the location of the mining vehicle in the loading area only on the basis of the dead reckoning,
and determining the location of the mining vehicle in the unloading areas both on the basis of the dead reckoning and by reading at least one identifier arranged in the unloading area.

8. A system for monitoring the location of a mining vehicle in a mine, the system comprising:
a first work area, a second work area, and a third work area in the mine, in which areas the mining vehicle is arranged to drive during one work cycle, and wherein the first work area and the third work area are provided with at least one identifier whose location is accurately known, and the second work area is provided with no identifier;
at least one measuring device for determining the distance traveled by the mining vehicle, and further at least one measuring device for determining the direction of the mining vehicle;
a mine control system;
at least one control unit arranged in the mining vehicle;
at least one data transfer connection for data transfer between the control unit of the mining vehicle and the mine control system;
wherein the size of the second work area is sufficient to cause a mining vehicle passing from the first work area through the second work area to the third work area to have discontinuities in location updates obtained by identifiers with accurately known locations;
and in which system:
location data of the mining vehicle are arranged to be transferred via the data transfer connection from the mining vehicle to the mine control system,
the location of the mining vehicle is arranged to be determined substantially continuously in the first work area, the second work area, and the third work area on the basis of a dead reckoning by taking into account the distance traveled and the direction;
the location of the mining vehicle is arranged to be determined only on the basis of the dead reckoning, when operating in the second work area;
at least one identifier whose location is known to the control unit is arranged in each of the first work area and the third work area;
the mining vehicle is arranged to identify the identifier when driving in the vicinity of the identifier in the first work area or the third work area;
the control unit is arranged to determine location data on the basis of the identification data;
and the control unit is arranged to update the location determined in the dead reckoning on the basis of the location data of the identifier in the first work area or the third work area.

9. A system as claimed in claim 8, wherein
at least one readable identifier whose exact location is known to the mine control system is arranged in the first work area or the third work area;
the mining vehicle comprises means for reading the identifier.

10. A system as claimed in claim 8 wherein
the first work area or the third work area comprises at least one predetermined critical location,
and at least one identifier is arranged in the immediate vicinity of said critical location.

* * * * *